(12) United States Patent
Hong

(10) Patent No.: US 11,943,856 B1
(45) Date of Patent: Mar. 26, 2024

(54) REMOTE LIGHT CONTROL DEVICE FOR LARGE LIGHT FIXTURE

(71) Applicant: DONG CHEON INC CO., LTD, Daejeon (KR)

(72) Inventor: Ik Pyo Hong, Daejeon (KR)

(73) Assignee: DONG CHEON INC CO., LTD, Daejeon (KR)

( * ) Notice: Subject to any disclaimer, the term of this patent is extended or adjusted under 35 U.S.C. 154(b) by 0 days.

(21) Appl. No.: 17/975,679

(22) Filed: Oct. 28, 2022

(30) Foreign Application Priority Data

Oct. 20, 2022 (KR) .................. 10-2022-0135487

(51) Int. Cl.
*H05B 47/175* (2020.01)
*G08C 19/00* (2006.01)
*H05B 47/155* (2020.01)

(52) U.S. Cl.
CPC .......... *H05B 47/175* (2020.01); *G08C 19/00* (2013.01); *H05B 47/155* (2020.01)

(58) Field of Classification Search
CPC ..... H05B 47/175; H05B 47/155; G08C 19/00
See application file for complete search history.

(56) References Cited

U.S. PATENT DOCUMENTS

| | | | |
|---|---|---|---|
| 11,415,308 B1* | 8/2022 | Haney | F21V 23/06 |
| 2022/0124898 A1* | 4/2022 | Choi | H05B 47/175 |
| 2022/0225487 A1* | 7/2022 | De Best | H05B 47/155 |

* cited by examiner

*Primary Examiner* — Minh D A
(74) *Attorney, Agent, or Firm* — United One Law Group LLC; Kongsik Kim; Jhongwoo Peck

(57) ABSTRACT

Proposed is a remote light control device for a large light fixture. Specifically, in the light control device, as in a conventional light control device, first, light emission of each of many groups of lights and each light of the large light fixture is individually controlled according to preset information input according to key manipulation by an administrator or the control signal of an external console 200. In this state according to the embodiment, a light control board which is connected to all lights in each of groups of lights of the large light fixture and individually performs light emission of the lights is installed behind the lights for example.

5 Claims, 5 Drawing Sheets

FIG. 4

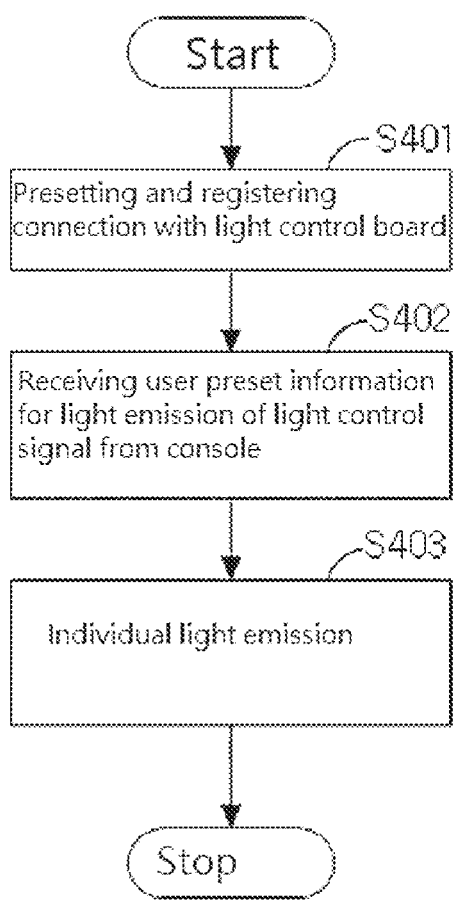

: * Light control board
: Connection to light belonging to each group of light for each group of light of large light fixture Individual light emission of light -> 1. Execution in matrix format corresponding to each light position based on port table 2. Combining and matching each of input/output ports in matrix format differently in port table for each of multiple different lights

REMOTE LIGHT CONTROL DEVICE FOR LARGE LIGHT FIXTURE

CROSS REFERENCE TO RELATED APPLICATION

The present application claims priority to Korean Patent Application No. 10-2022-0135487, filed Oct. 20, 2022, which is incorporated herein by reference in its entirety.

BACKGROUND

1. Technical Field

The present disclosure relates generally to a device which controls the brightness of lights of a large light fixture. More particularly, the present disclosure relates to a light control device which appropriately provides brightness of lights according to various situations by dividing the lights into many groups of lights in the large light fixture so as to differently control the brightness of the lights when controlling the brightness of the lights.

2. Description of the Related Art

Unless otherwise indicated herein, contents described in this section do not indicate a prior art to the claims of this application, and inclusion in this section is not an admission that it is prior art.

In general, light fixture is used for a normal lighting function and a function for decoration and is used in various outdoor areas in addition to indoor areas. For reference, an outdoor light is a light installed in an outdoor area, that is, a place without a roof, and there are landscape lighting to create a night scene and environmental lighting to ensure safety. A light fixture is exposed to rain and wind, and there must be a pillar or tower for installation of the light fixture.

In this case the light fixture creates various atmospheres by controlling the brightness of the lights thereof and turning on and off the lights. For example, a light fixture installed on a stage or filming set, that is, a large light fixture uses various elements such as illuminance, shading, and color to effectively express an atmosphere without inconvenience to the audience.

Particularly, a light tower installed in a baseball field or soccer field is rectangular in shape, and multiple lights are installed in the light tower, thereby providing various conveniences.

Meanwhile, outdoor light fixtures are located at a high place or are scattered in many places as light groups. In addition, in this state, some places may have shadows appearing due to nearby objects. Accordingly, the brightness of each light bulb is controlled to prevent a shaded area such as a shadow.

However, in a conventional technology, to remove a shadow, the brightness of each light bulb is manually adjusted. An administrator goes up on a light tower and adjusts the brightness of the light bulb.

Furthermore, as the thickness of a body part of a light device, that is, height between the upper and lower parts of the body part decreases, a shadow increases. When a distance between light sources is decreased to reduce a shadow, the number of the light sources is increased, which not only increases power used but also increases brightness excessively.

For example, a light source part may include a plurality of light sources. Each of the light sources may be longitudinally arranged at predetermined intervals on an inner surface of the upper surface part of the light source part. Accordingly, light of each of the light sources is irradiated toward a cover part, and the cover part can diffuse the light. Particularly, a distance between each of the light sources is required to be smaller than a vertical depth between the light source and an opening part to prevent a shadow (a phenomenon in which a side at which the light source is located is relatively bright and the surrounding area appears dark) caused by light diffused by the cover part.

Accordingly, as the thickness of the body part, that is, vertical height between the upper and lower surface parts of the body part decreases, a shadow increases. Furthermore, when a distance between the light sources is decreased to reduce such a shadow, the number of the light sources is increased, which not only increases power used but also increases brightness excessively.

Accordingly, there must be a new way of managing lighting that can solve this situation.

A prior art in this background is only the following document.

(Patent Document 0001) KR101969678 B1

For reference, the prior art disclosed in Patent Document 1 is different from the management of lighting in the new method described above, and relates to a light fixture in which the number of light sources is reduced and the occurrence of a shadow is reduced.

To this end, the light fixture includes: a first frame including a front opening part and a side part; a light source part provided on an inner surface of the side part; and a diffusion member which covers the front opening part and diffuses light emitted by the light source part.

SUMMARY

Accordingly, the present disclosure has been made keeping in mind the above problems occurring in the related art, and the present disclosure is intended to propose a remote light control device for a large light fixture in which a specific light control board is placed behind the lights of the large light fixture, and brightness of each of the lights is controlled according to various situations, thereby providing various conveniences.

In addition, in high places, or various outdoor places and stages or filming stages in which many light fixtures are installed, the light control device allows the brightness of lights of the light fixtures to be easily and rapidly controlled remotely by an administrator, thereby facilitating the maintenance and management of the large light fixture.

In order to achieve the above objective, according to an embodiment of the present disclosure, in a remote light control device for a large light fixture, as in a conventional light control device, first, light emission of each of many groups of lights and each light of the large light fixture is individually controlled according to preset information input according to key manipulation by an administrator or a control signal of an external console.

In this state, according to the embodiment, a light control board which is connected to all of lights belonging to each of the groups of lights of the large light fixture and individually performs light emission of the lights is installed behind the lights for example.

Accordingly, when each group of lights emits light, the light emission of each of multiple different lights in each group of lights at a remote location is performed through the light control board on the basis of a light position according to the preset information or control signal. Through this, the light emission of the lights of the large light fixture is performed according to various situations.

In this case, the light emission of the light on the basis of a light position is performed as follows.

That is, the light emission of multiple different lights is performed in a matrix format corresponding to the position of each of the lights on the basis of a preregistered port table on the light control board. In addition, the port table has input/output ports in a matrix format which are differently combined and matched for the light positions of the multiple different lights.

More specifically, a control part operates as follows.

First, the control part presets and registers connection with the light control board when the light control board which is connected to all of lights belonging to each of the groups of lights of the large light fixture at a remote location and individually performs light emission of the lights is installed in the large light fixture.

In addition, the control part receives the preset information or a control signal for the light emission of the lights for the light control board from a key signal input part or the console.

Accordingly, light emission of the multiple different lights in each of the groups of lights is individually and differently performed based on positions of the lights through the light control board by the input preset information or control signal. In addition, the above-described configuration is applied for the light emission of the lights on the basis of the light positions.

According to the embodiments, a specific light control board is placed behind the lights of the large light fixture, and brightness of each of the lights is controlled according to various situations as intended to be remotely controlled by an administrator, thereby providing various conveniences.

In addition, in high places, or various outdoor places and stages or filming places in which many light fixtures are installed, the light control device allows the brightness of lights of the light fixtures to be easily and rapidly controlled remotely by an administrator, thereby facilitating the maintenance and management of the large light fixture.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 4 is a flowchart of sequentially illustrating the operation of the remote light control device for a large light fixture according to the embodiment.

DETAILED DESCRIPTION

Figure 1:
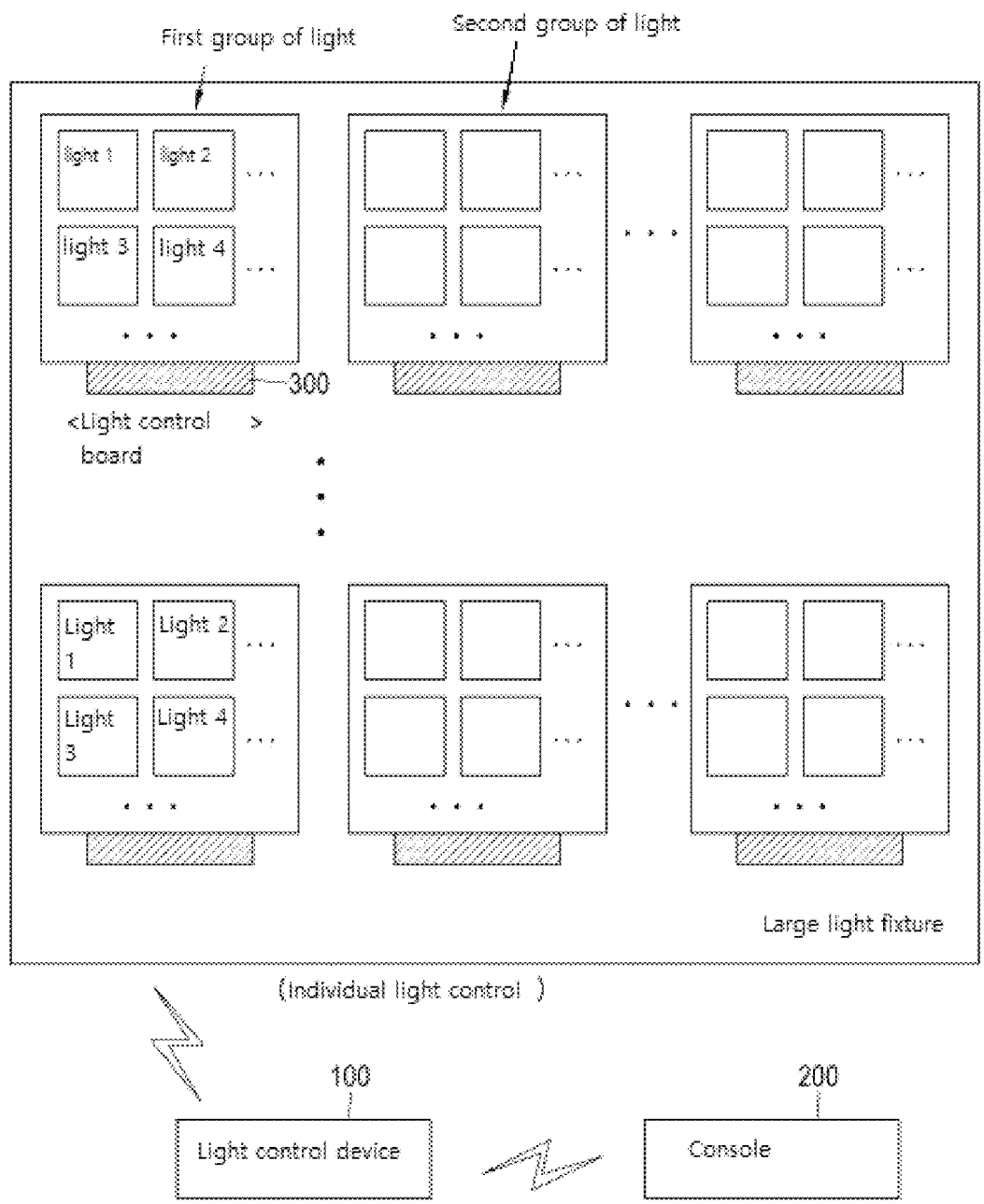
FIG. 1 is a view for conceptually explaining a remote light control device for a large light fixture according to an embodiment.

FIG. 1 is a view for conceptually explaining a remote light control device for a large light fixture according to an embodiment.

As illustrated in FIG. 1, in the light control device 100 according to the embodiment, as in a conventional light control device, first, light emission of each of many groups of lights and each light of the large light fixture is individually controlled according to preset information input according to key manipulation by an administrator or a control signal of an external console 200.

In this state, according to the embodiment, a light control board 300 which is connected to all lights in each of groups of lights of the large light fixture and individually performs light emission of the lights is installed behind the lights for example.

Accordingly, when performing light emission of lights, through the light control board 300, light emission of multiple different lights in each of groups of lights are remotely performed individually and differently based on a light position according to the preset information or control signal. Through this, the lights of the large light fixture are driven according to various situations.

In this case, light emission of lights based on the light position is performed as follows.

That is, the light emission of multiple different lights is performed in a matrix format by corresponding to the position of each light on the basis of a preregistered port table in the light control board. In addition, the port table has input/output ports in a matrix format which are differently combined and matched for the light positions of the multiple different lights.

For example, a light tower installed in a baseball field or soccer field is located at a high location and is rectangular in shape, and multiple lights are installed in the light tower. Through devices according to the embodiment, brightness of each light is remotely and individually controlled, that is, only in a shaded area such as a shadow appearing due to surrounding objects. Accordingly, a shadow does not easily appear on a part which an administrator intends to control.

In addition, to prevent the occurrence of a shadow, light of lights located at the uppermost position is the brightest, and light of lights located at the lowest position is the darkest.

Accordingly, in the embodiment, the specific light control board 300 is placed behind the lights of each of the groups of lights of the large light fixture, and the brightness of each of the lights is controlled according to various situations intended to be controlled by an administrator from a remote place, thereby providing several conveniences.

In addition, in high places, or various outdoor places and stages or filming places in which many light fixtures are installed, the light control device allows the brightness of lights of the light fixtures to be easily and rapidly controlled remotely by an administrator, thereby facilitating the maintenance and management of the large light fixture.

More detailed description of the light control device will be made below.

First, the light control device 100 according to the embodiment, like a conventional light control device, mainly includes a key signal input part, an information input/output part, a storage part, a control part, and a display part.

For reference, the key signal input part receives preset information for the light emission of lights belonging to multiple different groups of lights in a large light fixture in a remote location according to a key manipulation by an administrator.

In addition, the information input/output part is connected to the registered console 200 which mainly controls the light emission of the lights of each of the groups of lights of the large light fixture or to a registered external light drive device so as to input and output each information.

The storage part classifies and stores preset information and device registration information for each of the groups of lights and each light of the large light fixture.

According to the preset information received from the key signal input part or a control signal input/output by the information input/output part, the control part allows light emission of the groups of lights and lights of the large light fixture to be differently performed, based on a light position.

The display part displays information of each of the groups of lights and each light driven by the control part.

In this state, according to the embodiment, the control part performs the following operation.

First, the control part is preset and registered to be connected with the light control board 300 when the light control board which is connected to all lights belonging to each of the groups of lights of the large light fixture at a remote location and individually performs light emission of the lights is installed in the large light fixture.

In addition, the control part receives preset information or control signal for light emission of the lights for the light control board from the key signal input part or the console 200.

Accordingly, according to the input preset information or the control signal, the control part allows light emission of the multiple different lights in the groups of lights to be individually and differently performed based on a light position through the light control board.

In addition, light emission of a light on the basis of the light position according to the embodiment is performed as follows.

That is, each of multiple different lights emits light in a matrix format by corresponding to the position of each light on the basis of the preregistered port table in the light control board 300. In addition, the port table has input/output ports in a matrix format which are differently combined and matched for the positions of the multiple different lights.

Accordingly, in the embodiment, as described above, a specific light control board 300 is placed behind the lights of each of the groups of lights of the large light fixture, and the brightness of each light from a remote place is adjusted according various situations as desired by an administrator, thereby providing several conveniences.

In addition, in high places, or various outdoor places and stages or filming places in which many light fixtures are installed, the light control device allows the brightness of lights of the light fixtures to be easily and rapidly controlled remotely by an administrator, thereby facilitating the maintenance and management of the large light fixture.

Figure 2:
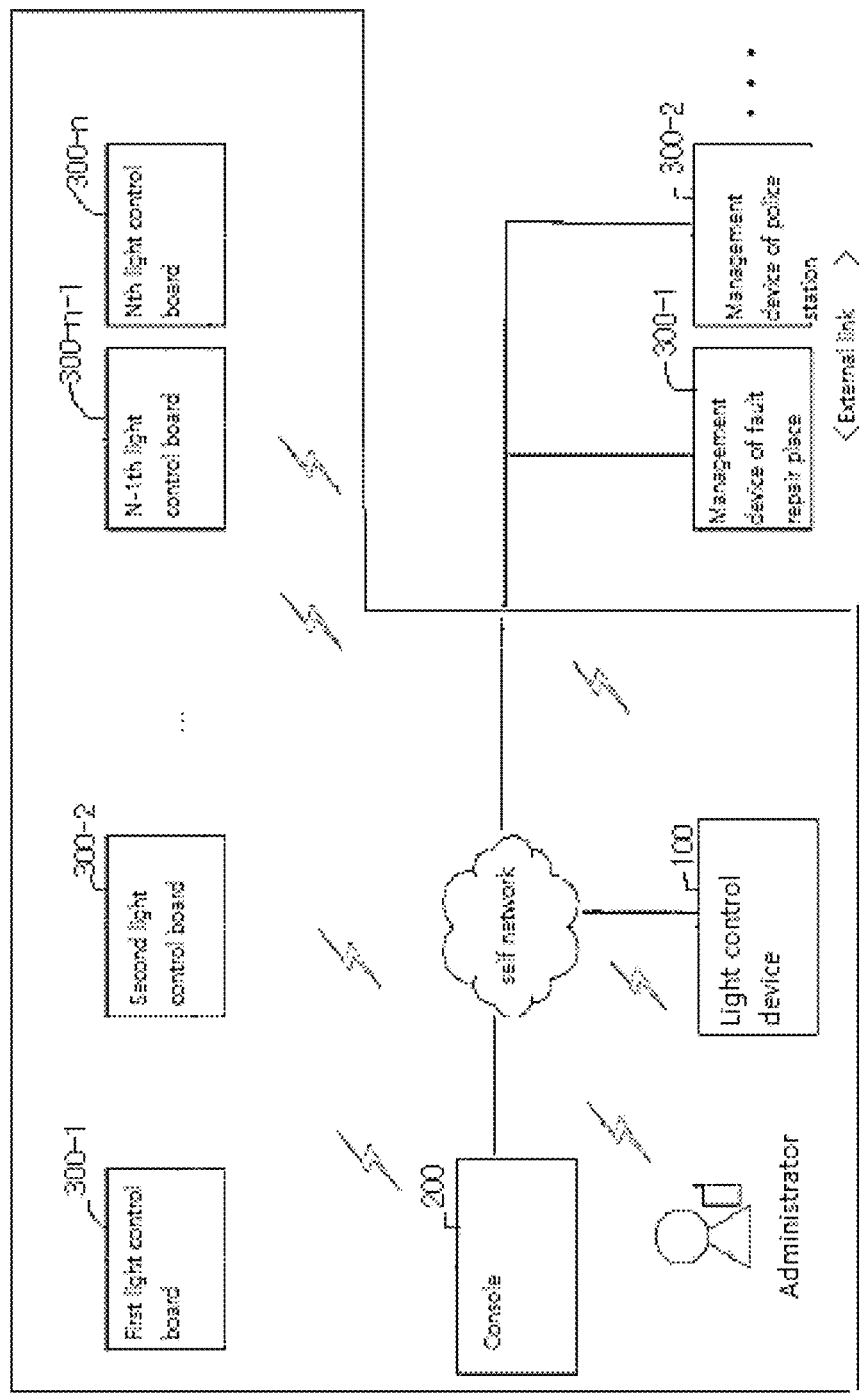
FIG. 2 is a view illustrating the whole of a system applied to the remote light control device for a large light fixture according to an embodiment.

FIG. 2 is a view illustrating the whole of a system applied to the remote light control device for a large light fixture according to the embodiment.

As illustrated in FIG. 2, the system according to the embodiment includes the remote light control device 100 for a large light fixture and the light control board 300 which are connected to each other through a self network.

Additionally, the system of the embodiment includes the console 200 which is a main management device connected to the remote light control device for a large light fixture, and external links, for example, a management device 300-1 of fault repair place and a management device 300-2 of a police station.

Additionally, in this case, the remote light control device 100 for a large light fixture and the light control board 300 are connected to each other by using any one of Wi-Fi, LoRA, RF, and Bluetooth (BT).

According to the remote light control device 100 for a large light fixture, when performing light emission of the multiple different lights of each of groups of lights in the large light fixture, the light emission of the multiple different lights in each of the groups of lights is remotely and individually performed based on the positions of the lights through the light control board 300.

The light control board 300 is installed for each of the groups of lights of the large light fixture. Furthermore, the light control board 300 is connected to all lights belonging to each of the groups of lights and individually performs the light emission of the lights. In addition, the light control board 300 is installed behind the lights. Additionally, for light emission of the light on the basis of each light position as described above, each of multiple different lights emits light in a matrix format by corresponding to each light position on the basis of the preregistered port table in the light control board 300. In this case, the port table has an input/output port in a matrix format matching each light position of the multiple different lights. Accordingly, the brightness of each of the lights of the large light fixture having many groups of lights in a high place or at many distributed positions is remotely controlled according to various situations intended to be controlled by an administrator, so the administrator easily and conveniently controls the brightness of the lights in the large light fixture.

Figure 3:
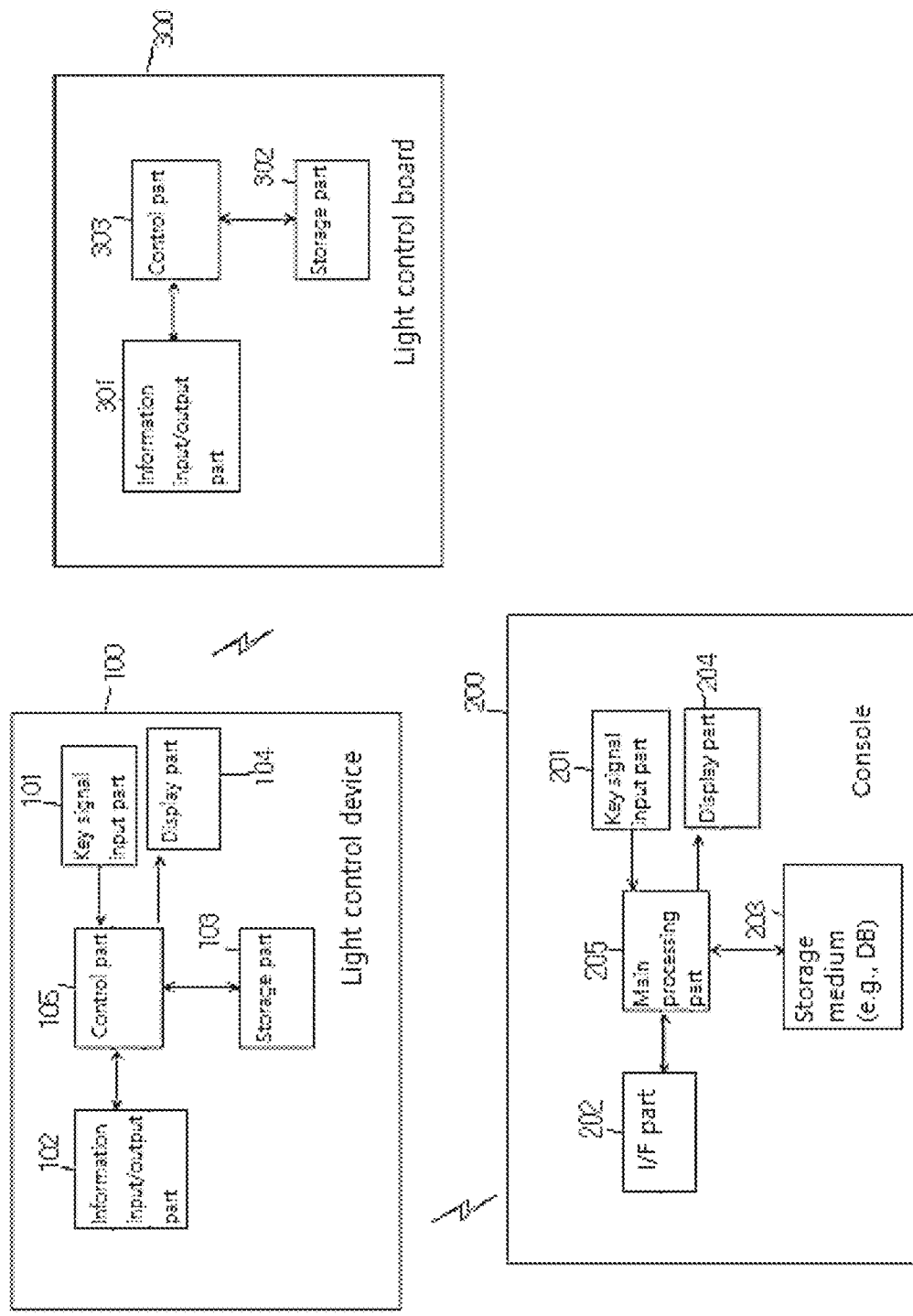
FIG. 3 is a block diagram illustrating the configuration of the remote light control device for a large light fixture according to the embodiment.

FIG. 3 is a block diagram illustrating the configuration of the remote light control device for a large light fixture according to the embodiment.

As illustrated in FIG. 3, the remote light control device 100 for a large light fixture according to the embodiment mainly includes the key signal input part 101, the information input/output part 102, the storage part 103, the display part 104, and the control part 105.

In addition, the light control board 300 according to the embodiment includes an information input/output part 301, a storage part 302, and a control part 303.

Additionally, the console 200 connected to the light control device 100 mainly includes a key signal input part 201, an I/F part 202, a storage medium 203, a display part 204, and a main processing part 205.

In the remote light control device for a large light fixture, the key signal input part 101 receives various types of preset information for light emission of lights belonging to multiple different groups of lights in the large light fixture according to key manipulation by an administrator. For example, the key signal input part 101 receives registration information and control preset information of the groups of lights and the lights, and light position preset information.

The information input/output part 102 is connected to a registered console which mainly controls the light emission of the lights of the groups of lights of the large light fixture, or a registered external light drive device, or the light control board so as to input/output or transmit/receive information.

According to the control of the control part 105, the storage part 103 classifies and stores the preset information, device registration information, and light position preset information of the groups of lights and lights of the large light fixture.

The control part 105 allows light emission of lights to be differently performed for each of the groups of lights and each light of the large light fixture according to preset information received from the key signal input part 101 or a control signal input/output by the information input/output part 102. In addition, according to the embodiment, when performing the light emission of the lights of each of the groups of lights in the large light fixture, the control part 105 allows light emission of multiple different lights in the groups of lights to be remotely and differently performed individually according to various situations based on the positions of the lights through the light control board.

The display part 104 displays information of each group of lights and each light thereof driven by the control part 105 and position information of the light.

In addition, the information input/output part 301 in the light control board 300 is connected to the remote light control device 100 for a large light fixture. Accordingly, the control part 105 of the remote light control device 100 for a large light fixture receives an individual control signal for each of multiple lights different from each other. Such an individual control signal is preset to identify the position of the light.

The control part 303 controls the storage part 302 to classify and store the preset information, light registration information, control information, and light position preset information of each light.

The control part 303 controls each part, and light emission of each light is individually performed according to the control signal based on the position of the light by the control of the control part 105.

FIG. 4 is a flowchart of sequentially illustrating the operation of the remote light control device for a large light fixture according to the embodiment.

As illustrated in FIG. 4, according to the remote light control device for a large light fixture according to the embodiment, first, the light control board is installed in each of many groups of lights of the large light fixture in a high place or at many locations, and the light control device presets and registers information of connection with the light control board at 5401. In addition, the light control board is connected to all lights belonging to each of the groups of lights, and individually performs light emission of the lights.

In this state, the control part receives preset information or control signal for the light emission of the lights for the light control board from the key signal input part or the console at 5402.

Accordingly, by the input preset information or the control signal, the control part allows light emission of multiple different lights in groups of lights to be individually performed based on the positions of the lights through the light control board according to various situations intended to be controlled by an administrator at 5403.

Meanwhile, the light emission of a light on the basis of a light position is performed as follows.

That is, the light emission of each light is performed in a matrix format corresponding to the light position of each of multiple different lights on the basis of the preregistered port table in the light control board. Additionally, the port table has input/output ports in a matrix format which are differently combined and matched for the positions of the multiple different lights.

For example, a light tower installed in a baseball field or soccer field is located at a high location and is rectangular in shape, and multiple lights are installed in the light tower. Through devices according to the embodiment, brightness of each light is remotely and individually controlled, that is, only in a shaded area such as a shadow appearing due to surrounding objects. Accordingly, a shadow is prevented from easily appearing in a part intended to be controlled by an administrator.

In addition, in order to prevent a shadow, the brightness of a light at the uppermost is the highest, and the brightness of a light at the bottom is the lowest.

As described above, in the embodiment, light emission of many groups of lights and lights of the large light fixture is individually controlled according to preset information input according to key manipulation by an administrator or the control signal of an external console 200.

In this state, according to the embodiment, a light control board 300 which is connected to all lights in each of groups of lights of the large light fixture and individually performs light emission of the lights is installed behind the lights for example.

Accordingly, when performing light emission of multiple different lights of each of groups of lights, light emission of the lights in each of the groups of lights is individually and remotely performed based on the light position of each of the different lights according to the preset information or control signal through the light control board.

In this case, the light emission of a light on the basis of a light position is performed as follows.

That is, the light emission of a light in a matrix format is performed by corresponding to the light position of each of multiple different lights on the basis of the preregistered port table in the light control board. In addition, the port table has an input/output port in a matrix format matching each light position of the multiple different lights.

Accordingly, in the embodiment, a specific light control board is placed behind the lights of each of the groups of lights of the large light fixture, and the brightness of each light from a remote place is controlled according to various situations intended to be controlled by an administrator, thereby providing various conveniences.

In addition, in high places, or outdoor places and stages or filming stages in which many light fixtures are installed, the brightness of lights of the light fixtures is easily and rapidly controlled remotely by an administrator, thereby facilitating the maintenance and management of the large light fixture.

Figure 5:
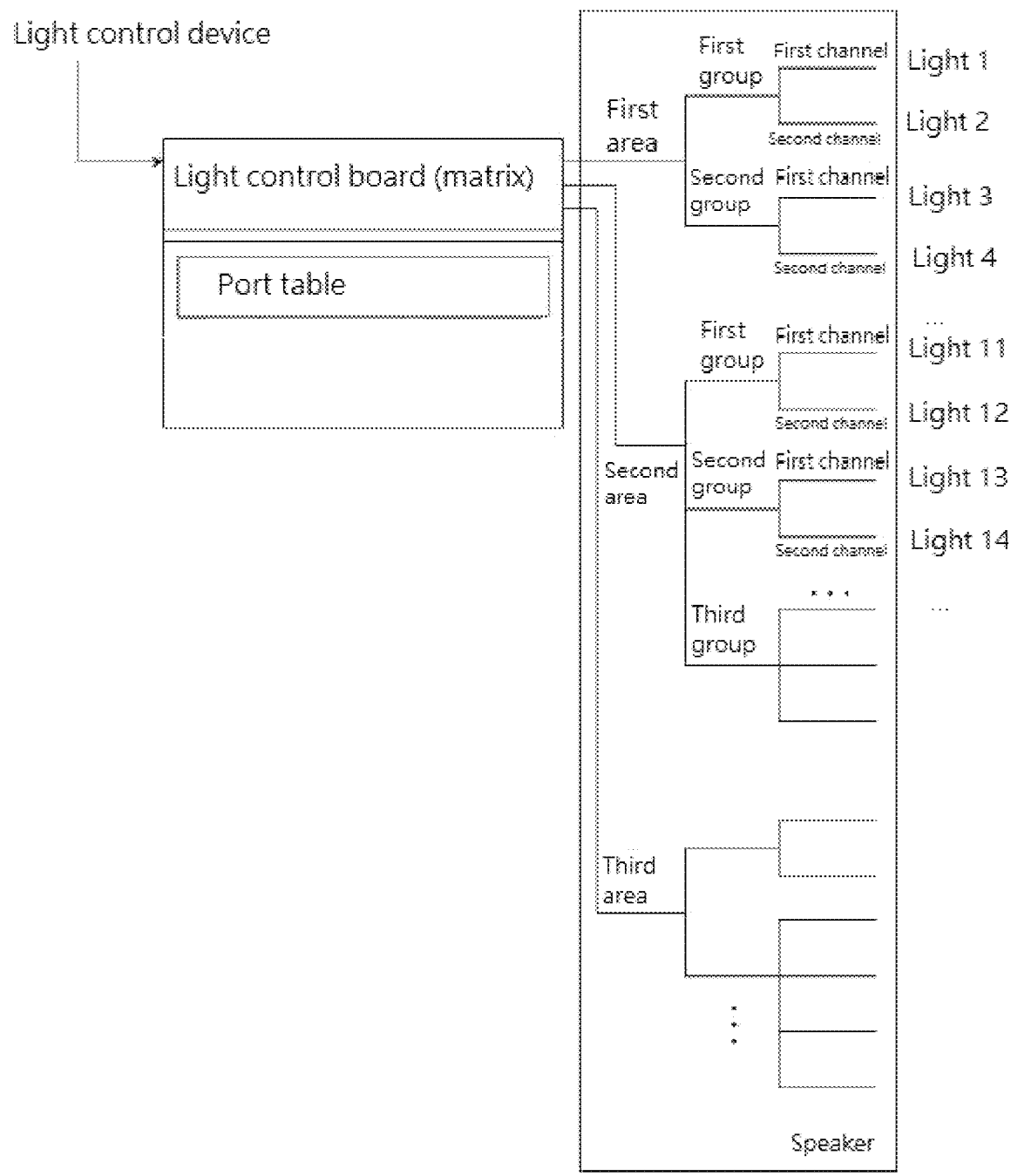
FIG. 5 is a view for explaining a port table applied to the remote light control device for a large light fixture according to the embodiment.

FIG. 5 is a view for explaining the port table applied to the remote light control device for a large light fixture according to the embodiment.

As illustrated in FIG. 5, as described above, the port table according to the embodiment has input/output ports in a matrix format which are differently combined and matched for the positions of the multiple different lights. Accordingly, light emission of multiple different lights belonging to a specific group of lights is performed in a matrix format corresponding to the light positions of the multiple different lights.

Accordingly, light emission of many lights belonging to a specific group of lights is easily and rapidly performed.

For example, as described above, light emission of lights is performed only in a shaded area.

In addition, the control part differently combines and matches the input/output ports in a matrix format for multiple different areas, groups, and channels for the positions of the lights in the port table on the light control board. The area, groups, and channels are determined as intended to be grouped by an administrator.

Accordingly, when remotely performing the light emission of lights through the port table, the light emission is variously switched from input/output ports in a matrix format for each area, group, and channel.

In addition, the control part switches the input/output operation for the input/output ports in a matrix format by corresponding only to each abnormal area, group, and channel when the lights are abnormal when performing the light emission of each of the lights for the area, group, and channel.

Accordingly, when the lights are abnormal or malfunctions, the operation of the lamps is easily and appropriately adjusted.

For another example, the control part differently combines and matches the input/output ports in a matrix format for the areas, groups, and channels in the port table of the light control board by corresponding to the hardware, software, and line type of an outdoor light.

Accordingly, the control part switches input/output operation for the input/output ports in a matrix format by corresponding to the hardware, software, and line type when performing light emission of the lamps for the areas, groups, and channels.

For example, the hardware is a management server, a light device, or a light control device, and the software is a method or app for controlling the brightness of a light. In addition, lines are various types of connecting lines used for management of lights.

In this case, for example, when the performance of the hardware is good, all lights belonging to the same channel are controlled under certain circumstances. In addition, when the performance of the hardware is normal, some lights belonging to the channel are simply controlled.

For another example, the control part differently combines and matches the input/output ports in a matrix format for the areas, groups, and channels in the port table by corresponding to the type of the abnormality of the outdoor light.

Through this, the control part switches input/output operation for the input/output ports of the port table by corresponding to the type of the abnormality of the outdoor light when performing the light emission of the lamps for the areas, groups, and channels.

For example, the type of abnormality includes abnormality of a server or abnormality of a line, and when a specific channel is abnormal, light emission of lamps belonging to a channel designated as a reserve is simply adjusted.

Accordingly, through this method, light emission of lights belonging to a specific group of lights is easily and rapidly controlled under various situations as intended to be controlled by an administrator.

Meanwhile, the control part performs the duplexing control of input/output operation for the input/output ports in a matrix format through the console when the outdoor light is detected as being abnormal during the switching, thereby performing the switching operation continuously when the outdoor light is abnormal.

For example, when the state of lights is in a preset normal state, the lights are maintained as they are, and when the state of the lights is in an abnormal state, the duplexed control is performed through a current console.

In addition, when there are multiple consoles, or when there are multiple main management devices, authority is granted thereto in order of a closest distance such that rapid duplexed control can be performed.

Additionally, when controlling the brightness of each light for each of the above-mentioned areas, groups, and channels, broadcasting information is provided for each of the areas, groups, and channels under the circumstances of using a large light device in conjunction with the method below. For example, the large light device is used in stage space or a sports arena.

Specifically, when controlling light emission for each area, group, and channel for each of the above-mentioned groups of lights and individual lights, the same area, group, and channel are preset to provide broadcasting information in connection with the lights.

For example, only an area A may be individually broadcast, all internal and external areas of A to N may be broadcast, and furthermore, the area A may be broadcast for various groups and channels.

In addition, when a malfunction occurs under such a condition of broadcasting for each area, group and channel, only associated area, group, and channel are switched and broadcast through the above-mentioned light control device or console at a remote location or through a broadcasting device.

Furthermore, since settings related to the area, group, and channel are synchronized with each other in various related devices, related DBs are matched and maintained in normal times to perform broadcasting which is actually helpful.

For reference, before explaining such a switching broadcast, the existing broadcast is first briefly described to help the understanding of the switching broadcast.

Specifically, according to a conventional technology, for broadcasting inside, a main information processing device connected to the console, a power divider, and a network I/O master are mainly provided. In addition, multiple amps, a speaker selector, and an audio output part including a speaker are included.

In addition, in this case, broadcast is provided directly from a field by further including a remote microphone.

Additionally, hubs and gateways for internal and external grouping are included.

A little more explanation of this basic configuration is as follows.

When broadcasting, the main information processing device performs overall management by presetting and transmitting basic broadcasting information to be broadcast according to key manipulation by an administrator for each area, group, channel desired by an administrator. For example, the basic broadcasting information is provided by a broadcasting company through CD players and tuners, and furthermore, is provided directly by an administrator in a field through a remote microphone. In this case, the main information processing device generally operates a broadcasting system by frequently changing broadcasting preset information with various programs. Additionally, devices related to this, for example, include a speaker selector and a control device that check for abnormalities for each channel of speaker lines and turn on/off while listening to output sound. In addition, when performing public address broadcasting, the main information processing device which has a window-based graphic user interface (GUI), efficiently controls, manages, and searches the public address broadcasting.

When broadcasting through the main information processing device, the power divider receives broadcast driving power from multiple different power sources and distributes the power to each internal part. Accordingly, the power divider normally supplies power to rack equipment, and in case of a power outage, converts the power from AC power to DC power (battery) and supplies the DC power preferentially.

When transmitting broadcasting information of the main information processing device for different areas, groups and channels inside, the network I/O master receives broadcast information from the main information processing device, multiplexes the broadcast information to a corresponding channel to be broadcast.

Meanwhile, in order to send out the broadcast information, the multiple amps, the speaker selector, and the speaker are installed differently for each area, group, and channel, and the information is broadcast only to a location desired by an administrator.

For reference, the multiple amps are installed for each of internal and external parts, that is, for each of a network I/O master and a transceiver by corresponding to multiple different area, groups, and channels, thereby amplifying a plurality of broadcasting information.

In addition, multiple speaker selectors select broadcasting only to a specific channel when abnormality occurs. In this case, the multiple speaker selectors operates a speaker by selecting switches of each of 16 individual groups and all groups by output signals of up to 8 power amplifiers. Particularly, each channel has the line checker function of a 3-line speaker during normal broadcasting. In addition, each channel also has the function of transmitting audio output signals as a group for remotely monitoring the audio output signals during broadcasting.

Furthermore, multiple speakers subdivide broadcasting information and output the subdivided information to respective channels and, for example, are installed for each area and are assigned individual IP addresses. In addition, such a speaker uses a digital amplifier or a speaker having an amplifier provided therein.

Meanwhile, when the hub broadcasts inside and outside each facility, the hub broadcasts broadcasting information between each part, for example, relays the broadcasting information from the main information processing device to the network I/O master or from an audio encoder to a gateway. In addition, in this case, the hub includes, for example, a network gateway, and is used in connection with an internal network and an external network. A multicast packet used in the internal network is changed to TCP/IP which can be used in the external network to be transmitted and received.

Additionally, when broadcasting is performed in this way, the gateway allows broadcasting information from the outside of each facility to be relayed between the facilities, for example, to be relayed between a facility in an area a and a facility in an area b.

Accordingly, in this way, conventional broadcasting is carried out.

In addition, in this state, the above-mentioned switching broadcasting is performed.

Meanwhile, when controlling the light emission of lights, the light control device collects various pieces of state information from a separate means provided in the light control board, thereby improving monitoring and convenience thereof.

Furthermore, the separate means has improved self-diagnosis and watchdog functions for major parts in conjunction with the light control device and rapidly restores the parts even in the event of failures of the parts To this end, the large light fixture operates as follows.

First, the large light fixture collects multiple pieces of environment state information different from each other around and provides the same to the light control device and console according to the embodiment.

In addition, the large light fixture includes a data input/output module which collects the environment state information in analog and digital formats.

Furthermore, the large light fixture includes a communication part which differently transmits the collected environment state information according to a transmission format preset for each control type of the light control device and receives a control signal.

Additionally, the large light fixture further includes a control part which controls the transmission and reception of the communication part and differently controls the operation of each part according to the control signal. For example, the large light fixture uses a main control part of the light control board.

In this state, when transmitting various types of information, the control part compares the state of each of the main control part of the light control board and a communication device with the preset normal state of each of the control part and device.

As a result of the comparison, when the state of the main control part is normal, the main control part is not reset, and when the state of the main control part is abnormal, the main control part is reset.

Next, when the state of the communication device is in a preset normal state thereof, the power of the communication device is not turned off, and when the state of the communication device is out of the preset normal state, the power of the communication device is turned off.

Additionally, the main control part operates variously as follows.

1) First, when the environment state information is collected, the main control part collects the state information of ambient temperature and humidity to determine state of the current temperature and humidity and differently controls the operation of the fan and heater for the state of current temperature and humidity to properly maintain operation environment (for example, stage space).

2) In addition, when the environment state information is collected, the main control part collects the state information of surrounding fine dust, determines the current state of the fine dust, and provides the state information to the light control device or console according to the embodiment.

3) In addition, when the environment state information is collected in this way, the main control part collects surrounding vibration state information, determines a current vibration state, and provides the vibration state to the light control device or the console according to the embodiment. Accordingly, the main control part notifies external impact and protects various devices.

4) Furthermore, when the environment state information is collected, the main control part collects the illuminance state information of a light to determine a current screen illuminance state. As a result of the determination, when the current screen illuminance state is a preset normal state, the main control part confirms the current screen illuminance state as normal. In addition, when the current screen illuminance state is not a preset normal state, the main control part confirms the current screen illuminance state as malfunctional. Accordingly, the main control part notifies whether the light is malfunctional.

5) When the environment state information is collected, the main control part collects neighboring proximity state information to determine a current neighboring state. As a result of the determination turns, when the current neighboring proximity state is within a preset proximity distance, the main control part turns on an external light. In addition, when the current neighboring proximity state is not within a preset proximity distance, the main control part turns off the external light. Through this, the main control part turns on the external light when a target approaches the surrounding of the external light at night to make the target recognize the presence of the external light, thereby preventing accidents.

Meanwhile, when controlling the light emission of lights, a light control device, a console, and a light control board according to another embodiment have the same preset information, registration information, and actual information as the preset information, registration information, and actual information of the light control device, the console, and the light control board according to the above-mentioned embodiment, thereby enabling various types of rapid actions to be taken.

1) To this end, first, a table storing the preset information, registration information (e.g., device registration information), and actual information of the light control device, the console, and the light control board is identically provided, and the matching relationships of the same for the table are preset and preregistered.

2) Next, when any one of three devices changes associated information, remaining two devices change the associated information identically in accordance to the change of the information in the table according to the matching relationship, so that consistent information is maintained between the devices.

3) Additionally, when maintaining consistent information between these devices, I/O ports are configured in a matrix format for multiple different devices from a preset I/O port format such that the I/O ports are made pluralistic.

Accordingly, whenever this information is maintained to be consistent, information input/output is performed pluralistically by collectively performing changing operation for each of different devices due to the configuration of the I/O ports.

On the other hand, in such a configuration, when providing a control signal from the console to the light control device, information is securely transmitted in a distributed encryption method of the following method such that the information is processed in a secure manner.

That is, when providing a control signal, the control signal, that is, control information is first provided in this method by using associated keys according to the number n of light control devices and the characteristic of an exclusive logical sum.

Accordingly, by using this information, n partial secret keys are created, and encrypted information is stored in each of the partial secret keys of the n pieces for encryption processing.

Briefly explaining this background, as a terminal has high-performance and high-capacity, the importance of protecting and managing important information inside the terminal is emerging.

In order to protect and manage such important information, a conventional method of encrypting the important information of a terminal, storing the information in an external storage device, and backing the information up is used.

However, in a case in which important information is stored in one external storage device, when the storage device is hacked, the important information may be easily leaked.

Therefore, in storing important information in the external storage device, a more secure method is required.

Particularly, in the case of the encryption processing, the method of inputting a random initial value and secret keys is blocked by using a scramble, so that distributed encryption can be provided more effectively.

To this end, in the case of encryption in this way, information from encryption configuration below is encrypted and provided to an associated device.

In addition, the configuration is as follows.

1) That is, when receiving specific control information, one different secret key is selected according to the shape or length of a plaintext based on an advanced encryption standard (AES) encryption method.

In addition, a cipher text is obtained by repeatedly executing one of multiple different rounds according to the size of the secret key.

Furthermore, an academy research institute agency (ARIA) encryption format including round key addition, substitution layer, and diffusion layer is applied to each round function.

2) Accordingly, before performing the round key addition operation, modulation is performed by first performing an exclusive OR with n−1 scramblers (n is the number of scrambles) from the plaintext and the secret key.

3) Next, such modulation information is preset as n partial secret keys, and one different partial secret key is provided to each of n objects.

4) Accordingly, when the modulation is performed in this way, a cipher text is obtained by repeatedly executing a function for each round including one round of round key addition operation according to the size of the secret key.

In addition, whenever the cipher text (format) is obtained, the scrambler systematically disappears in the round key addition operation, and an operation result is obtained in the same format as a commercial AES.

On the other hand, in this configuration, when light emitting operation is controlled in this way, the brightness of a light is controlled according to an environment from the following method, thereby controlling the brightness of the light more effectively for various environments.

For example, as described above, when there is a light fixture is in a high location such as a baseball field or soccer field, the brightness of each light is remotely controlled by being limited only to a shaded area such as a shadow, thereby preventing a shadow in a part intended to be controlled by an administrator.

In this case, the brightness of a shaded part is controlled according to various environments, thereby efficiently controlling the brightness of a light according to various environments.

1) First, in the case of controlling the brightness of lights in this way, a method of classifying and learning for each place and environment type is defined based on environmental information including temperature, humidity, illuminance, noise, and vibration information in each of the installation places of multiple different large light fixtures.

2) Next, for each installation place (or type of installation place), information sets are collected and accumulated according to environmental information or the type thereof.

3) In addition, by using the accumulated information sets, the properties of information are determined for each installation place and environment.

4) Next, the determined information is processed normally.

5) Accordingly, an independent variable and a dependent variable by which information to control the brightness of lights is obtained according to each environment is preset for each of installation places of multiple different large light fixtures.

For example, in the above-mentioned situation, an independent variable and a dependent variable are preset for obtaining the area of an upper part to be brightened and the area of a lower part to be darkened.

In this case, the independent variable is brightness control information of a light, and the dependent variable includes various installation places and environmental factors with relative to the reference brightness.

6) Accordingly, by learning through this information, the method described above is obtained.

Additionally, this method is also as follows.

For example, a property status is slightly different according to normal times, a situation in which people are rare, or a situation in which people are crowded, and thus different methods are created to suit such environments. In addition, this method may be made for each place, or a standard may be preset to make several bundles. This allows an appropriate method to be determined according to the characteristics of information.

In addition, when information is transmitted to create this method, there are cases in which a large number of information is not collected and in which abnormalities are detected due to errors in equipment. In this case, the information is required to be removed. Accordingly, after creating a basic information set through this, properties are added for additional necessary information.

Furthermore, occasionally, when some information is not collected due to the interruption of information, the associated information is removed.

Accordingly, next, valid properties are determined for each method, normal values are created, and independent and dependent variables are determined.

Meanwhile, when these devices control the brightness of lights in this way, brightness control information is preset differently according to installation purpose and installation target (e.g., a light fixture or light device) for each installation place, so that brightness control suitable for various situations can be performed more efficiently.

To this end, in this configuration, the brightness of lights is controlled according to installation purpose, installation place type, and installation target suitable for installation places from registration information set in advance by corresponding to the installation purpose, installation place type, and installation target for each of the installation places, thereby making the brightness control of lights more convenient.

For example, a light fixture is installed for a general purpose, protection at a crime zone, and spot lighting, and the installation site of the light fixture includes a general place, a crime zone, and a place for audiences/structures, etc.

The detailed operation of the light fixture will be described below.

First, the above-described method is preset according to the installation place and environment of the large light fixture which has many groups of lights at high places or many positions.

In addition, the presetting for the light control device according to the embodiment is performed in the same way as described above.

That is, the light control board is installed on each of the groups of lights of the large light fixture to preset and register connection information. In addition, the light control board is connected to all lights belonging to each of the groups of lights and individually performs light emission of the lights.

In this state, the control part receives preset information or a control signal for light emission of lights for the light control board from the key signal input part or the console.

Accordingly, by the received preset information or control signal, the control part allows light emission of multiple different lights in each of the groups of lights to be individually performed based on the positions of the lights through the light control board according to various situations intended to be controlled by an administrator.

In this case, as described above, light emission of lights is performed by corresponding to various installation places and environment.

For example, according to the installation places and environment of the large light fixture, the brightness of lights is increased or decreased relative to reference light emitting operation.

Detailed description of light emission will be made below.

First, the installation place and environment of the large light fixture are recognized, light brightness control information for the installation place and environment is extracted from the above-described method, and the brightness of lights is increased or decreased from the reference light emitting operation.

Accordingly, in the another embodiment, the brightness of lights is controlled according to the installation place and environment of a large light fixture having many groups of lights in a high place or many locations.

For reference, the light emission of a light on the basis of the light position is performed as follows.

That is, a light emits light in a matrix format corresponding to the light position of each of multiple different lights on the basis of the preregistered port table in the light control board. Furthermore, the port table has input/output ports combined with the multiple different lights by matching light positions of the multiple different lights.

As a practical example, in order to prevent shadows from occurring in the installation place and environment of a light fixture such as a baseball field or soccer field, an uppermost part thereof is made relatively small and brightness is also slightly reduced in a relatively bright installation place and in a cool environment. In addition, in a relatively dark and hot environment, the uppermost part is made larger and the brightness is increased a little more.

As described above, like a conventional technology, in the embodiment, first, light emission of each of many groups of lights and each light of the large light fixture is individually controlled according to preset information input according to key manipulation by an administrator or the control signal of an external console 200.

In addition, according to the embodiment, the light control board which is connected to all lights in each of groups of lights of the large light fixture and individually performs light emission of the lights is installed behind the lights for example.

Accordingly, when performing light emission of multiple different lights of each of groups of lights, light emission of the lights in each of the groups of lights is individually and remotely performed based on the position of each of the lights according to the preset information or control signal through the light control board.

In this state, the brightness of lights is controlled according to the installation place and environment of the large light fixture having many groups of lights in a high place or at many positions.

Accordingly, in the embodiment, a specific light control board is placed behind the lights of the large light fixture, and the brightness of each of the lights is remotely controlled according to various situations intended to be controlled by an administrator and according to installation place and environment of the large light fixture, thereby providing more convenience.

In addition, in high places or various outdoor places and stages or filming stages in which many light fixtures are installed, the brightness of lights of the light fixtures is easily and rapidly controlled remotely by an administrator according to installation place and environment of a large light fixture, thereby further facilitating the maintenance and management of the large light fixture.

What is claimed is:

1. A remote light control device for a large light fixture, the device comprising:

a key signal input part which receives preset information for light emission of lights belonging to multiple different groups of lights in a large light fixture in a remote location according to key manipulation by an administrator;

an information input/output part connected to a registered console which mainly controls the light emission of the lights of the groups of lights of the large light fixture or to a registered external light drive device so as to input and output each information;

a storage part which classifies and stores preset information and device registration information for each of the groups of lights and each light of the large light fixture;

a control part which allows the light emission of each of the lights to be differently performed for each of the groups of lights and each light of the large light fixture according to preset information received from the key signal input part or a control signal input/output by the information input/output part; and a display part which displays information of each of the groups of lights and each light driven by the control part, wherein the control part is configured to perform:

a first step of presetting and registering connection of the control part with a light control board after installing the light control board which is connected to all lights belonging to each of the groups of lights of the remote large light fixture and individually performs light emission of the lights;

a second step of receiving the preset information or control signal for the light emission of the lights for the light control board from the key signal input part or the console; and a third step of allowing the light emission of the multiple different lights in the groups of lights to be individually and differently performed based on positions of the lights through the light control board by the received preset information or control signal, wherein in the third step, the light emission of the lights based on the positions of the lights is performed in a matrix format corresponding to a position of each of the multiple different lights based on a preregistered port table in the light control board, and wherein the port table has input/output ports in a matrix format which are differently combined and matched for the positions of the multiple different lights.

2. The device of claim 1, wherein the third step of the control part comprises:

a step 3-1 of switching light emission from matched input/output ports for multiple different areas, groups, and channels when remotely performing the light emission of the lights through the port table by differently combining and matching the input/output ports in a matrix format for the multiple different areas, groups, and channels for the positions of the lights in the port table on the light control board; and a step 3-2 of switching input/output operation for the input/output ports in a matrix format by corresponding only to each abnormal area, group, and channel when the lights are abnormal when performing the light emission of lights for the areas, groups, and channels.

3. The device of claim 2, wherein the third step of the control part further comprises:

a step 3-3 of switching the input/output operation for the input/output ports in a matrix format by corresponding to the hardware, the software, and line type when performing the light emission of the lamps for the areas, groups, and channels by differently combining and matching the input/output ports in a matrix format for the areas, groups, and channels by corresponding to hardware, software, and line type of an outdoor light in the port table of the light control board.

4. The device of claim 3, wherein the third step of the control part further comprises:

a step 3-4 of switching the input/output operation for the input/output ports in a matrix format of the port table by corresponding to a type of abnormality of the outdoor light when performing the light emission of the lamps for the areas, groups, and channels by differently combining and matching the input/output ports in a matrix format for the areas, groups, and channels in the port table by corresponding to the type of the abnormality of the outdoor light.

5. The device of claim 4, wherein the third step of the control part further comprises:

a step 3-5 of switching the input/output operation for the input/output ports when the outdoor light is abnormal by performing a duplexing control of the input/output operation for the input/output ports of the port table through the console when the outdoor light is detected as being abnormal during the switching.

* * * * *